United States Patent
Burkett

(10) Patent No.: US 7,543,895 B2
(45) Date of Patent: Jun. 9, 2009

(54) METAL-SHEATHED COMPOSITE VEHICLE AXLE

(76) Inventor: Jerald S. Burkett, 8115 Calland Rd., West Liberty, OH (US) 43357

( * ) Notice: Subject to any disclaimer, the term of this patent is extended or adjusted under 35 U.S.C. 154(b) by 0 days.

(21) Appl. No.: 11/639,033

(22) Filed: Dec. 14, 2006

(65) Prior Publication Data

US 2008/0143174 A1 Jun. 19, 2008

(51) Int. Cl.
  *B60B 35/00* (2006.01)
  *F16C 3/02* (2006.01)
(52) U.S. Cl. .............. 301/124.1; 301/137; 464/181; 464/183
(58) Field of Classification Search ........... 301/124.1, 301/125, 137; 464/181, 182, 183
  See application file for complete search history.

(56) References Cited

U.S. PATENT DOCUMENTS

| | | | | |
|---|---|---|---|---|
| 2,512,186 | A * | 6/1950 | Urschel | 295/36.1 |
| 2,611,656 | A * | 9/1952 | Vanderberg | 301/124.1 |
| 2,667,047 | A * | 1/1954 | William | 464/183 |
| 3,592,884 | A * | 7/1971 | Williams | 264/5 |
| 3,756,646 | A * | 9/1973 | Gimlett et al. | 295/43 |
| 3,769,813 | A * | 11/1973 | Okada | 464/58 |
| 4,200,326 | A * | 4/1980 | Wilcox | 295/23 |
| 4,275,122 | A * | 6/1981 | Fisher | 428/542.8 |
| 4,729,455 | A * | 3/1988 | May | 188/58 |
| 5,230,661 | A * | 7/1993 | Schreiber et al. | 464/181 |
| 5,342,464 | A * | 8/1994 | McIntire et al. | 156/172 |
| 5,346,432 | A * | 9/1994 | Greulich et al. | 464/180 |
| 5,397,272 | A * | 3/1995 | Smiley et al. | 464/181 |
| 6,122,996 | A * | 9/2000 | Hauser et al. | 74/607 |
| 6,247,346 | B1 * | 6/2001 | Dickson, Jr. | 72/370.13 |
| 6,299,258 | B1 * | 10/2001 | Wright et al. | 301/124.1 |
| 6,409,606 | B1 * | 6/2002 | Nakajima et al. | 464/181 |
| 6,572,199 | B1 * | 6/2003 | Creek et al. | 301/124.1 |
| 6,863,763 | B2 * | 3/2005 | Lee et al. | 156/188 |
| 2004/0256910 | A1 * | 12/2004 | Chalin et al. | 301/124.1 |
| 2005/0159229 | A1 * | 7/2005 | Lee et al. | 464/181 |

* cited by examiner

*Primary Examiner*—Russell D Stormer
(74) *Attorney, Agent, or Firm*—Kremblas, Foster, Phillips & Pollick

(57) ABSTRACT

A vehicle axle formed having a composite tubular member and a pair of metal sheaths spaced apart from one another at opposite ends of the composite tubular member. The composite tubular member has an outer wall surface and an interior elongated channel, with the interior channel having an inner wall surface. The composite tubular member also has a first end wall and a second end wall at opposite ends of the composite tubular member. Each of the metal sheaths has an outer surface, an inner surface, an inner end portion having an inner end portion edge, and an outer end portion having an outer end portion edge. Each metal sheath inner end portion has a transition area, with the transition area having a first area of changing thickness and a second area of a substantially constant thickness. Each of the metal sheaths has stabilization keyways formed in the outer surface thereof to accommodate a key, with the key when positioned in the stabilization keyways precluding the rotation of a wheel hub about the axle.

14 Claims, 3 Drawing Sheets

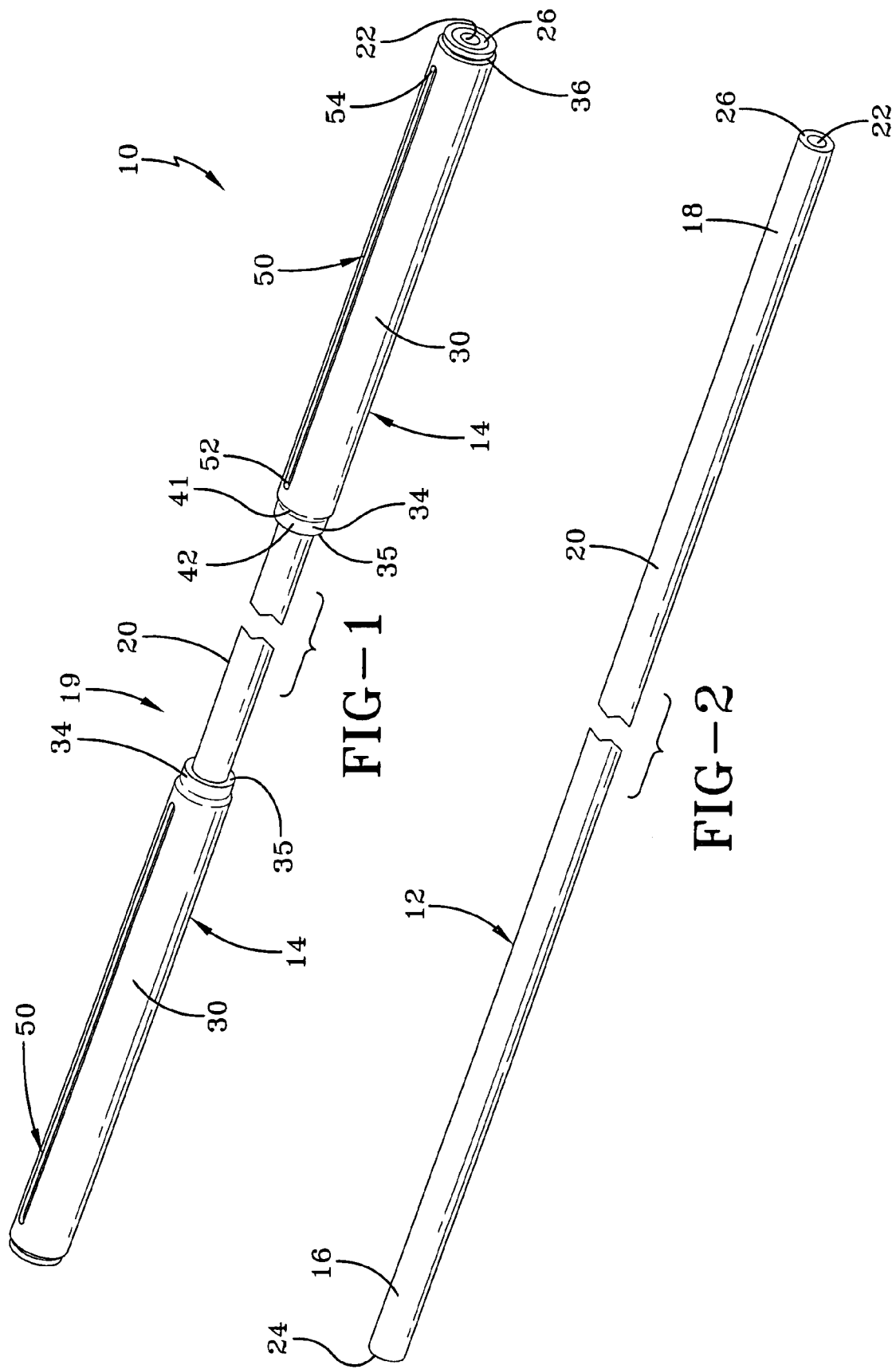

METAL-SHEATHED COMPOSITE VEHICLE AXLE

BACKGROUND OF THE INVENTION

1. Field of the Invention

This invention relates generally to vehicle axles, and more particularly, to a composite tubular vehicle axle having each of its opposite ends encased within a tubular metal sheath.

2. Description of the Related Art

This invention is directed to the providing of a metal-sheathed composite axle for use with vehicles. In the manufacture of vehicles, an axle is typically utilized to support the weight of the vehicle, as well as the transferring of the torsional loads of braking and acceleration from the drive train to the wheels of the vehicle, with the wheels being mechanically mounted to the axle in ways well known in the art.

Axles traditionally have been made of metal due to metal's strength; however, metal axles are not without some drawbacks. For example, when used in go karts and midget go karts, a metal axle can be bent by sustaining an impact at its end if the side of the kart crashes into the wall surrounding the track or if the vehicle is struck in the vicinity of its axle by another vehicle.

Thus for example, one of the standard chrome-moly steel axles used in connection with the aforesaid vehicles is made to bend when it is subjected to 1161 pounds. Furthermore, once the axle is bent, the vehicle needs to be taken out of service and repaired, since the bent axle is permanently bent.

Attempts at strengthening axles have often focused on the dimensions associated with the axle, the selection of the metal from which the axle is fabricated, or the formulation of the alloy used in its manufacture. Whatever option is selected, weight is a consideration whether it relates to the mileage the vehicle gets or the speed of the vehicle: when it comes to weight and either mileage or speed, lighter typically translates as better. However, regardless of which option is selected, if the axle sustains a significant blow to its end, the axle may become bent.

The aforesaid options have been the ones that typically have received attention from axle designers because of prior problems using composites in connection with axles. Composite materials (graphite, boron, aramid, or glass fibers held in epoxy, polyester, vinylester matrices etc.), have extremely high strength to weight ratios. Thus, tubular shafts made of a composite material are typically lighter in weight than comparable metal shafts or rods, plus they are capable of high stiffness-to-weight-ratios. Consequently all-composite shafts have started to replace metal shafts for the transmission of tensile, compression, bending, and/or torsional loads.

Some common applications of all-composite material tubular shafts are rollers in paper mills, bicycle frames, driveshafts, and golf club shafts. In connection with these applications, it is well known in the art of composite shaft construction, to bond end pieces usually made of metal into the open ends of these all-composite tubes to transmit forces into the tube from the adjacent mechanism or structure.

However, the use of composite tubing or composite shafts as a vehicle axle has faced two main problems. First, most vehicle axles have multiple load locations along the exterior of the axle that must transfer torsional loads (drivetrain, braking, wheels) and bending loads (vehicle weight through bearing carrier to chassis). These multiple load locations along the entire length of the axle rule out common or typical composite shafts with end pieces bonded in the ends of the tube as described above. Secondly, to accommodate these multiple load locations along the surface of an all-composite tube, keyway cuts or other mechanical configurations such as key slots would be necessary to connect brake rotors, drive sprockets, and wheels for the transmission of torsional loads. These required mechanical configurations in an all-composite tube would expose the fundamental weakness of all composite materials, namely that although composite lamini have the highest unidirectional properties, they also have very poor bearing stress strengths and interlaminar shear strengths. This is why composites have not found favor in vehicle axles.

For example, if a keyway cut is made in the mid-section of a specially designed all-composite tube for supposed use as a vehicle axle, within a short period of time, the key slot becomes what is known as "mushroomed." This condition is indicative of the fact that the ultimate bearing strength of the composite material has been exceeded. Alternatively, if a spline cut is made on an axle manufactured as an all-composite tube to transmit normal torsional loads, the splines would quickly shear off indicating that the interlaminar shear strength had been exceeded.

It is thus apparent that the need exists for an axle that utilizes composite technology to result in a light, yet strong axle, and which is relatively easy and cost effective to fabricate and utilize.

SUMMARY OF THE INVENTION

In accordance with the present invention, there is disclosed a metal-sheathed composite axle having a vehicle axle formed having a composite tubular member and a pair of metal sheaths spaced apart from one another at opposite ends of the composite tubular member. The composite tubular member has an outer wall surface and an interior elongated channel, with the interior channel having an inner wall surface. The composite tubular member also has a first end wall and a second end wall at opposite ends of the composite tubular member. Each of the metal sheaths has an outer surface, an inner surface, an inner end portion having an inner end portion edge, and an outer end portion having an outer end portion edge. Each metal sheath inner end portion has a transition area, with the transition area having a first area of changing thickness and a second area of a substantially constant thickness. Each of the metal sheaths has stabilization means formed in the outer surface thereof to accommodate a key, with the key when positioned in the stabilization means precluding the rotation of a wheel hub about the axle.

Preferably the stabilization means uses a keyway. In one embodiment the keyway is formed as an elongated slot recessed into the outer surface of each of the metal sheaths, with the keyway being configured to receive a key. In another embodiment, the stabilization means features a splined portion in each of the metal sheaths. Where a splined portion is utilized, it too is configured to receive a key, with the key being of an elongated planar shape with two substantially parallel surfaces on opposite sides of the key, with one of the substantially parallel surfaces having at least two projections extending therefrom and with the splined portion having at least two apertures therein. In this embodiment, each of the projections extends through one of the apertures.

Preferably the inner surface of the metal sheath is textured. Additionally, the axle has an ultimate failure load of at least 1800 pounds. Preferably the composite tubular member is comprised of a composite filament wound using a combination of a low angle helical wrap as well as a circumferential wrap. Preferably each of the metal sheaths has a snap-ring groove directly adjacent its outer end portion edge. Also, the axle preferably includes a bonding agent located between the composite tubular member and each of the metal sheaths. The bonding agent is preferably an adhesive or a resin. Preferably, the composite tubular member and each of the metal sheaths are friction-fit.

The axle of this invention is fabricated with the composite tubular member having an elongated axis, preferably with the composite tubular member having filaments that comprise its inner surface wound in a layer circumferentially to the elongated axis of the composite tubular member and with the filaments that comprise its outer surface wound in a layer circumferentially to the elongated axis of the composite tubular member. Furthermore, at least some of the filaments are wound intermediate the circumferentially wound layers in a low angle helical wrap.

The primary objective of this invention is to provide a lightweight vehicle axle fabricated utilizing composite technology.

Another objective of this invention is to provide such a device which is relatively easy to install in its operative position.

Still another objective of this invention is to provide a vehicle axle that is stronger than existing metal axles when the end of the axle is subjected to a significant impact.

Other objects and advantages of the invention will be apparent from the following description, the accompanying drawings and the appended claims.

BRIEF DESCRIPTION OF THE DRAWINGS

FIG. 1 is an exploded perspective view of a vehicle axle made in accordance with this invention.

FIG. 2 is an exploded perspective view of the composite tubular member of this invention.

Figure 3:
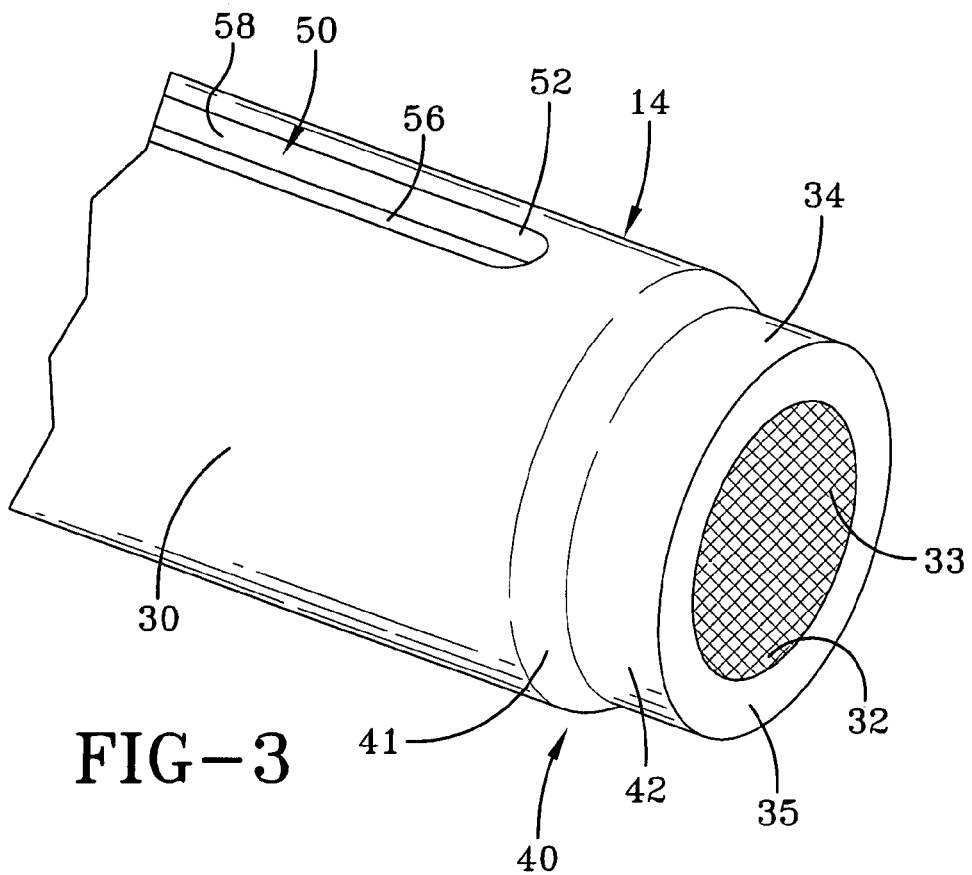
FIG. 3 is a perspective view on an enlarged scale of the inner end portion of one of the metal sheaths of this invention.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose.

DETAILED DESCRIPTION OF THE INVENTION

This invention addresses the above limitations and fully utilizes the potential of composite materials resulting in a lightweight, rugged vehicular axle. Having reference to the drawings, attention is directed first to FIG. 1, which discloses a metal-sheathed composite vehicle axle made in accordance with the invention, designated generally by the numeral 10. Comparison of FIGS. 1, 2, and 6 discloses that the axle 10 of this invention is fabricated having a composite tubular member 12 with a metal sheath 14 attached at the first end 16 and at the second end 18 respectively of the composite tubular member 12. Thus, when assembled the axle 10 features an intermediate axle section 19 located between the metal sheaths at the opposite ends of the axle.

Figure 4:
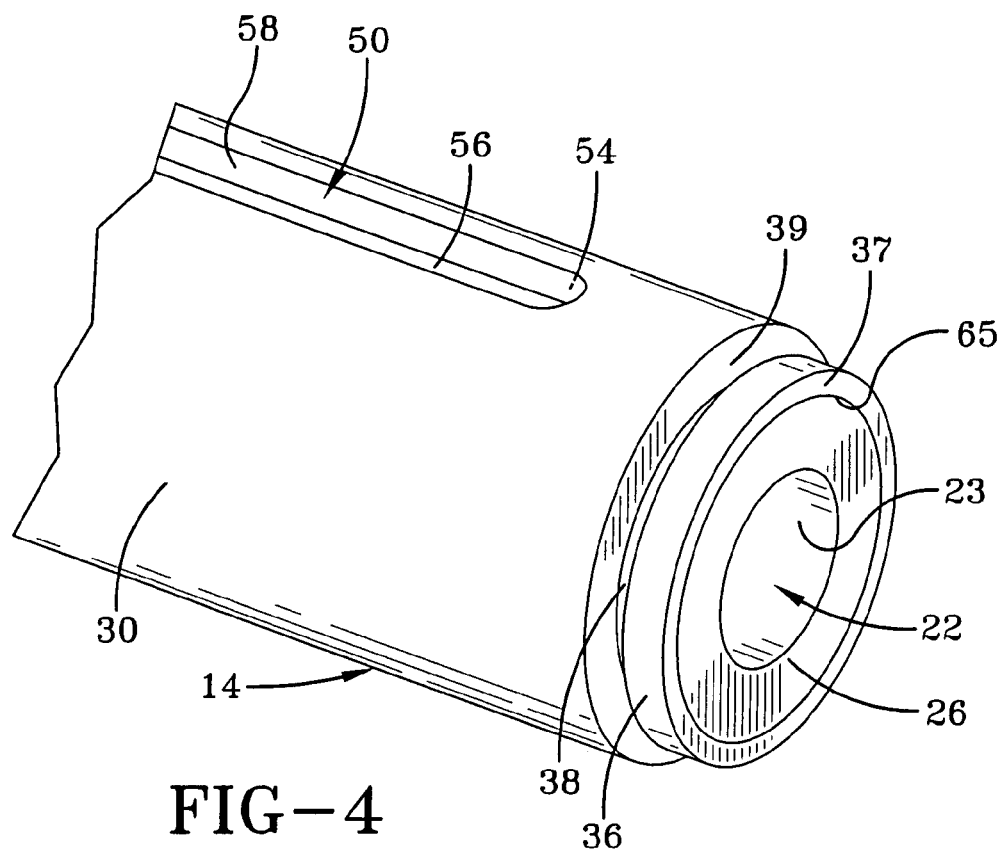
FIG. 4 is a perspective view on an enlarged scale of the outer end portion of one of the metal sheaths of this invention shown as the axle of this invention is assembled with the composite tubular member therein.

As can be appreciated from a comparison of FIGS. 2 and 4, the composite tubular member 12 has an outer wall surface 20 and an interior channel 22, with the interior channel having an inner wall surface 23. As is the case with other composite tubular members, this component of the invention is manufactured by having a composite filament wound over a steel mandrel in the manner well known to those of ordinary skill in the art. Once the winding is complete, the filament winding is cured, and thereafter the steel mandrel is pulled out resulting in a solid composite tube. While in the preferred embodiment of the invention, a carbon fiber material is used, a glass fiber, or any of the other composite material compositions known in the art including those mentioned above could be utilized with these fibers typically being in a thermoset or thermoplastic resin matrix such as an epoxy. It should also be appreciated that the chosen fiber could have a high modulus, an intermediate modulus, or a standard modulus (all terms well known to those of ordinary skill in the art) depending on the stiffness of the axle that is ultimately desired. Thus, if a stiffer axle is desired then the composite material would be of a high modulus.

Once formed and cured, the composite tubular member has its ends trimmed, resulting in a tube with a first end wall 24 and a second end wall 26. As formed, it should be appreciated that the composite tubular portion is a laminated structure formed preferably by utilization of both a low angle helical wrap and a circumferential wrap (90° to the elongated axis of the tube). While there could be more than one way of accomplishing this wrapping, the preferred embodiment of this invention is made using a circumferential wrap, followed by a low angle helical wrap, followed by yet another layer of circumferential wrap. In this three layer laminate, the two circumferentially wrapped layers are of substantially equal thickness, with the overall ratio of low angle helical wrap to circumferential wrap being about 2.5:1. Depending on the specific composite used and the resin or epoxy used to hold the filament strand together, the thickness of each layer of wrap can range from 0.005"-0.025".

Turning now to the construction of each of the metal sheaths 14, they are preferably fabricated from aluminum or an aluminum alloy and as can be appreciated from a comparison of FIGS. 1-4, each sheath 14 has a metal sheath outer surface 30 and a metal sheath inner surface 32, with the inner surface 32 being textured 33 as is disclosed in FIG. 3. This texturing can be the result of such things as knurling, abrading, roughening, cutting, or dimpling. The texturing facilitates a better bonding of the sheath to the composite tubular member, especially when a bonding agent is used.

The metal sheath also possesses a metal sheath inner end portion 34 with an inner end portion edge 35 and a metal sheath outer end portion 36 with an outer end portion edge 37. Directly adjacent to the outer end portion edge 37 is a snap-ring groove 38, with a snap-ring groove edge 39 extending between the main portion of the outer surface 30 and the snap-ring groove 38.

Figure 5:
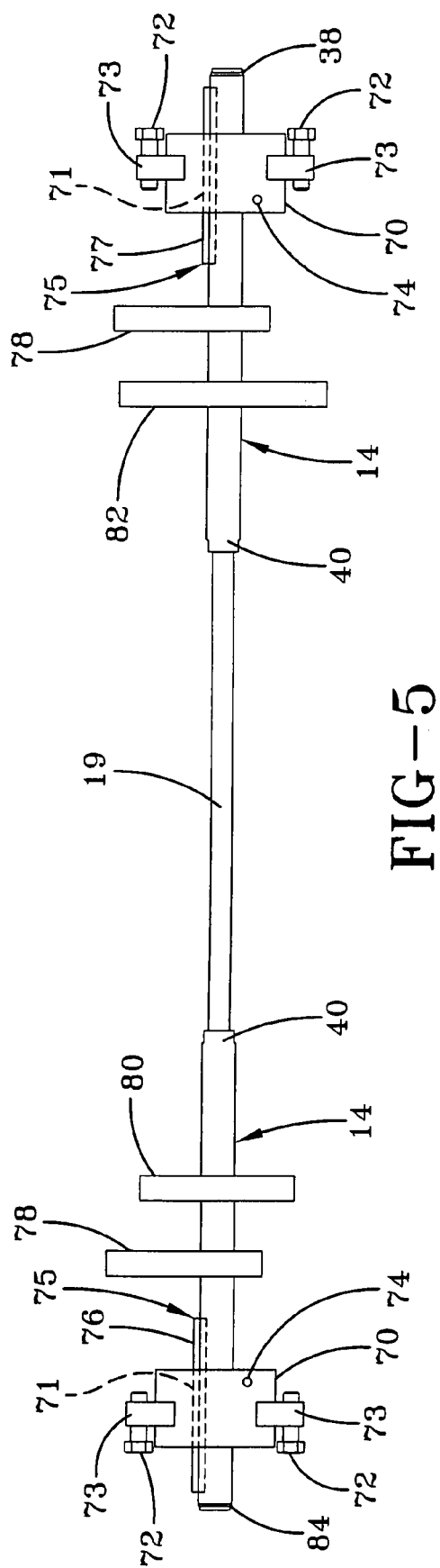
FIG. 5 is a schematic view of a vehicle axle embodying the invention in a more operative mode.

As can best be appreciated from a comparison of FIGS. 1, 3, and 5, the metal sheath inner edge portion 35 includes a transition area 40 with the transition area having a first area 41 and a second area 42. The first area 41 has the outer diameter of the metal sheath tapering downwardly until the second area 42 begins. Unlike the first area whose outer diameter gradually decreases until it reaches the second area 42, the second area has a substantially constant outer diameter.

Although the axle of the invention can be made in various outer diameters and with varying composite thicknesses depending on the amount of bend desired in the axle, an axle made in accordance with this invention exhibits no point load in the transition area. As a result, the axle of this invention is designed not to break even though it is fabricated using a composite material, only bend, and in most cases after bending occurs the axle will return to its previous elongated configuration.

For purposes of example only, one embodiment of the invention fabricated with a 1.25" O.D. (outer diameter) axle has the majority of the metal sheath having a thickness of 0.055". In the transition area, the thickness gradually tapers until it is 0.026". Meanwhile, the composite tubular material in this embodiment has a 1.14" O.D. and a 0.900" I.D. (inner diameter), such that the composite wall thickness is 0.120". It should be understood that the dimensions listed above will vary depending on the stiffness of the specific composite tubular material used, and the outer diameter of the axle which depends on the type of vehicle involved. The axle of this invention has already been used with go-karts, quarter midget go-karts, and ATV (all terrain vehicles), and could be utilized in conjunction with other vehicles having at least one axle.

The metal sheath also has a stabilization means 50 to prevent vehicle components that are attached to the axle, such as a wheel hub 70 from freely rotating around the axle. In the preferred embodiment of the invention, the stabilization means features a keyway (i.e. a slot) having a keyway first end 52 and a keyway second end 54, with the slot 50 having a bottom surface 56 and a sidewall 58. The elongated keyway extends in a straight line parallel to the elongated axis of the axle.

In actual use, each of the metal sheaths 14 is friction-fit or press-fit onto the opposite ends of the composite tubular member 12. To aid in securing the sheaths in place, a bonding agent 65, such as a resin or adhesive of the type known in the art of bonding metals and composite materials is applied to the inner surface 32 of the metal sheaths. In the preferred embodiment of the invention, due to the texturing of the inner surface, the texturing results in a stronger bond between the metal and the composite material. In the preferred embodiment of the invention, an aerospace adhesive of the type well known in the art for bonding with aluminum is selected.

Again for purposes of example, FIG. 5 discloses in schematic form typical vehicle axle attachments of the types mentioned above, such as wheel hubs 70, sprocket hubs 80, and brake disk hubs 82 all of which are well known in vehicle art. An example of one well known type of wheel hub (used in go-karts and midget go-karts) has a hub keyway 71 that extends in a straight line completely from one side of the wheel hub to the other parallel to the elongated axis of the axle to which the wheel hub is secured. Conventional wheel attachment means 72, such as nuts and bolts, hold a wheel (not shown) to a conventional wheel attachment portion 73 (often numbering three per wheel hub, each of which wheel attachment portion resembles an outwardly projecting flange member with a hole drilled through it to accommodate the wheel attachment means 72. Typically a pinch bolt 74 is used to tighten the wheel hub 70 to the axle normally using an allen wrench in the manner well known in the prior art.

An elongated key 75 of the type known in the art is used in conjunction with the stabilization means 50. The key 75 includes a key sidewall 76 and planar top and bottom surfaces 77. As disclosed in FIG. 5, an axle retention means 78 is used to assist in keeping the axle in the middle of vehicle. While the prior art typically uses snap ring grooves in this position on quarter midget karts, corresponding axles made in accordance with this invention will use a collar similar to those in the prior art to hold the axle in place. As is also shown in FIG. 5, a snap ring 84 is placed on each end of the axle in the snap-ring groove 38 to assist in holding the wheel hub on the axle, with conforming to certain industry requirements.

Figure 6:
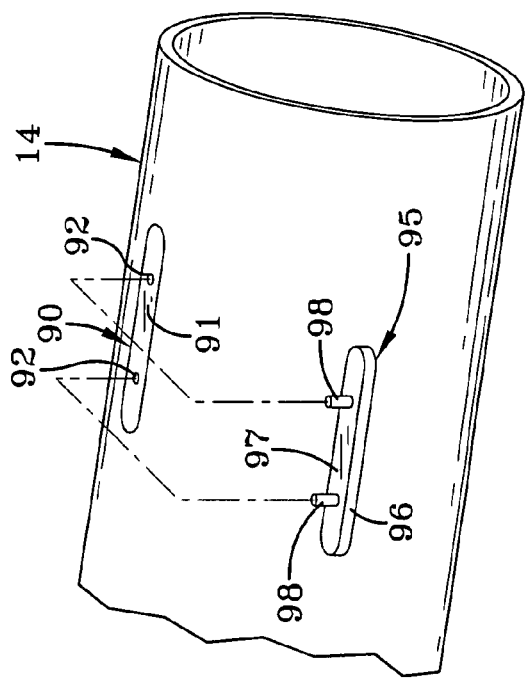
FIG. 6 is an exploded perspective view on an enlarged scale showing an alternative stabilization means.

Alternative embodiment of stabilization means is disclosed in FIG. 6, with this stabilization means utilizing cooperating spline and key construction. In this embodiment, the splined area 90 has a planar surface 91 preferably with a plurality of apertures 92. Additionally, the key 95 has a typical sidewall 96 and an engaging surface 97 which abuts the planar surface 91. Still further, the key 95 has a projection or as shown has two projections 98 which are inserted into the apertures 92 in the splined area. The opposite side of the key has a planar surface typical of keys that engage objects such as wheel hubs. However, due to the uniqueness of this invention, the thickness of key 95 (and key 75) is less than is associated with traditional prior art keys.

A key aspect of this invention is that the composite tube exterior surface has no cuts for any mechanical drivers such as keyways, but instead utilizes a pair of long, thin metal sleeves with the mechanical configurations needed, such as keyways or splines, already machined into each of the sleeves. Each metal sleeve is pressed and bonded to the exterior of the composite tubular member. Thus, this invention utilizes the high bearing and shear strengths of metals to transfer torsional and bending loads to the composite tube over a very large surface area.

Another key aspect of this invention is the design where the metal sleeve and composite tubular member work together or fail simultaneously in bending. It is important to note that in the embodiment of this invention, neither material fails before the other. Instead, the filament angle and composition of the composite material matches the bending strength of each of the chosen metal sleeves. The deflections of each match one another at their respective ultimate load points.

Thus a stronger and lighter axle is achieved. For example, in comparing prior art steel or aluminum axles with the axle of this invention, the axle of this invention is significantly lighter yet cost-competitive. Additionally, while the yield point of a 1.25" O.D. steel midget go-kart axle is 1,161 pounds (the weight at which the axle is becomes permanently bent when an impact occurs at the end of the axle), that of a 1.25" O.D. solid aluminum axle is 1,261 pounds, and that of a 1.25" O.D. ultra high strength carbon/aluminum axle is 1,640 pounds, the corresponding point of failure for 1.25" O.D. axles made in accordance with this invention has been measured as being greater than 1800 pounds (some even greater than 1,900 pounds), a significant improvement not heretofore obtained in axle manufacture.

Furthermore, until failure of the axle of this invention is achieved, relatively high impacts will result in the bending or flexing of the axle with that deformation being only temporary. Thus for some impacts that would have disabled a prior art metal axle, the axle of this invention bends and then returns to its original shape, thus not requiring the vehicle be taken out of operation. Additionally, not only is the axle of this invention more flexible than standard metal axles, the flexibility in combination with the naturally inherent vibration dampening characteristics of composite materials results in a smoother ride in the vehicle chassis. This smoother ride translates into a faster ride.

While the form of apparatus herein described constitutes a preferred embodiment of the present invention, it is to be understood that the invention is not limited to this precise form of apparatus and that changes may be made therein without departing from the scope of the invention which is defined in the appended claims.

What is claimed is:

1. A vehicle axle comprising
  a composite tubular member, said composite tubular member having an outer wall surface and an interior elongated channel, said interior channel having an inner wall surface, said composite tubular member also having a first end wall and a second end wall at opposite ends of said composite tubular member, a pair of metal sheaths mounted on said at opposite ends of said composite tubular member, each of said sheaths having an outer surface, an inner surface, an innermost end portion having an inner end portion edge, said inner end portion edges facing one another in spaced apart relationship on said composite tubular member, and an outer end portion having an outer end portion edge, said inner end portion having a transition area, said transition area having a first area of changing thickness and a second area of a substantially constant thickness, each of said metal sheaths having stabilization means formed in the outer surface of each of said metal sheaths.

2. The axle according to claim 1 wherein said stabilization means comprises a keyway.

3. The axle according to claim 2 wherein said keyway comprises an elongated slot recessed into said outer surface of each of said metal sheaths, said keyway configured to receive a key.

4. The axle according to claim 1 wherein said stabilization means comprises a splined portion in each of said metal sheaths.

5. The axle according to claim 4 wherein said splined portion being configured to receive a key, said key being of an elongated planar shape having two substantially parallel surfaces on opposite sides of said key, with one of said substantially parallel surfaces having at least two projections extending therefrom and said splined portion having at least two apertures therein, each of said projections extending through one of said apertures.

6. The axle according to claim 1 wherein said metal sheath inner surface is textured.

7. The axle according to claim 6 wherein metal sheath inner surface is textured by a selection of one or more of the following: dimpling, abrading, cutting, or knurling.

8. The axle according to claim 1 wherein said axle has an ultimate failure load of at least 1800 pounds.

9. The axle according to claim 1 wherein said composite tubular member is comprised of a composite filament wound using a combination of a low angle helical wrap as well as a circumferential wrap.

10. The axle according to claim 1 wherein each of said metal sheaths has a snap-ring groove directly adjacent its outer end portion edge.

11. The axle of claim 1 which includes a bonding agent located between said composite tubular member and each of said metal sheaths.

12. The axle of claim 1 wherein said composite tubular member and each of said metal sheaths are friction-fit.

13. The axle of claim 9 wherein said composite tubular member has an elongated axis, said composite tubular member having the filaments that comprise its inner surface wound in a layer circumferentially to the elongated axis of said composite tubular member and the filaments that comprise its outer surface wound in a layer circumferentially to the elongated axis of said composite tubular member, and with at least some of the filaments wound intermediate said circumferentially wound layers being wound in a low angle helical wrap.

14. The axle of claim 11 wherein said bonding agent is an adhesive or a resin.

* * * * *